(12) United States Patent
Owaku et al.

(10) Patent No.: US 8,373,808 B2
(45) Date of Patent: Feb. 12, 2013

(54) LIQUID CRYSTAL PARALLAX BARRIER, DISPLAY DEVICE AND LIQUID CRYSTAL DISPLAY DEVICE

(75) Inventors: Yoshiharu Owaku, Mobara (JP); Toshio Miyazawa, Chiba (JP); Hironori Kondo, Mobara (JP)

(73) Assignees: Hitachi Displays, Ltd., Chiba (JP); Panasonic Liquid Crystal Display Co., Ltd., Hyogo-ken (JP)

( * ) Notice: Subject to any disclaimer, the term of this patent is extended or adjusted under 35 U.S.C. 154(b) by 57 days.

(21) Appl. No.: 12/828,791

(22) Filed: Jul. 1, 2010

(65) Prior Publication Data
US 2011/0001894 A1 Jan. 6, 2011

(30) Foreign Application Priority Data
Jul. 3, 2009 (JP) ................................ 2009-159206

(51) Int. Cl.
G02F 1/1335 (2006.01)
(52) U.S. Cl. ......................................................... 349/15
(58) Field of Classification Search .................... 349/15
See application file for complete search history.

(56) References Cited

U.S. PATENT DOCUMENTS
8,045,070 B2 * 10/2011 Park et al. ........................ 349/15
2012/0113337 A1 * 5/2012 Chen et al. ....................... 349/15

FOREIGN PATENT DOCUMENTS
JP 3-119889 5/1991

* cited by examiner

Primary Examiner — James Dudek
(74) Attorney, Agent, or Firm — Antonelli, Terry, Stout & Kraus, LLP.

(57) ABSTRACT

A liquid crystal parallax barrier panel has the structure formed by stacking an electrode substrate, a liquid crystal layer and a sealing substrate in order. The electrode substrate includes a glass substrate, a first electrode which is branched in plural stages, a second electrode which is arranged on the same layer as the first electrode and is branched in plural stages, and an alignment film. Out of the first electrode and the second electrode, twig portions which include distal ends of branched portions of one electrode and twig portions which include distal ends of branched portions of another electrode are alternately arranged such that the twig portion which includes the distal end of the branched portion of one electrode enters between two twig portions which include the distal ends of branched portions of another electrode. In a state where slits are not formed in a parallax barrier, the first electrode and the second electrode have the same voltage, while the slits are formed in the parallax barrier when a predetermined voltage is applied to the first electrode.

10 Claims, 9 Drawing Sheets

LIQUID CRYSTAL PARALLAX BARRIER, DISPLAY DEVICE AND LIQUID CRYSTAL DISPLAY DEVICE

The present application claims priority from Japanese application JP 2009-159206 filed on Jul. 3, 2009, the content of which is hereby incorporated by reference into this application.

BACKGROUND OF THE INVENTION

1. Field of the Invention

The present invention relates to a liquid crystal parallax barrier, a display device and a liquid crystal display device, and more particularly to a liquid crystal parallax barrier which forms a parallax barrier for performing a three-dimensional display by controlling the alignment of liquid crystal molecules, and a display device and a liquid crystal display device which makes use of the liquid crystal parallax barrier.

2. Description of the Related Art

Conventionally, as one of methods for displaying a three-dimensional image without using eyeglasses, there has been known a parallax barrier method. The parallax barrier method is a method where an image which is formed by cutting an image in a field of view from a right eye and an image in a field of view from a left eye into strips vertically and by alternately arranging the strip images is set behind a sheet which is referred to as a parallax barrier and in which a plurality of vertical minute slits are formed, and a three-dimensional image is displayed by allowing a viewer to observe the image through the parallax barrier.

JP 3-119889 A (patent document 1) discloses a liquid crystal display device which can display both a two-dimensional image and a three-dimensional image by constituting such a parallax barrier with a device which uses liquid crystal (hereinafter referred to as "liquid crystal parallax barrier").

SUMMARY OF THE INVENTION

The display device disclosed in patent document 1 which can display both a two-dimensional image and a three-dimensional image using one display device is useful. However, even in such a display device, the number of opportunities where a two-dimensional image is displayed is far larger than the number of opportunities where a three-dimensional image is displayed and hence, there are many users who are not particularly interested in purchasing a display device having a function of displaying a three-dimensional image. Here, to increase the number of opportunities where a three-dimensional image is displayed, it is necessary to increase the number of users who make use of the display device which can display both the two-dimensional image and the three-dimensional image using one display device. That is, to increase the number of opportunities that the users make use of the three-dimensional image, it is desirable that such a display device is manufactured at a lower cost.

The present invention has been made in view of such a circumstance, and it is an object of the present invention to manufacture a liquid crystal parallax barrier at a lower cost.

According to one aspect of the present invention, there is provided a liquid crystal parallax barrier which forms a parallax barrier for performing a three-dimensional display by controlling alignment of liquid crystal molecules, the liquid crystal parallax barrier which includes: two glass substrates which are arranged parallel to each other; liquid crystal which is sealed between two glass substrates; and a plurality of electrodes for controlling alignment of the liquid crystal molecules, wherein the plurality of electrodes are arranged on only one glass substrate out of two glass substrates, and the parallax barrier is formed by making a voltage applied to one electrode different from a voltage applied to another electrode out of the plurality of electrodes.

In the liquid crystal parallax barrier according to the present invention, the plurality of electrodes are constituted of a first electrode and a second electrode which are formed on the same plane, the first electrode and the second electrode are branched respectively, out of the first electrode and the second electrode, twig portions which include distal ends of branched portions of one electrode and twig portions which include distal ends of branched portions of another electrode are alternately arranged such that the twig portion of one electrode is arranged between two twig portions of another electrode.

In the liquid crystal parallax barrier according to the present invention, the twig portions which include the distal ends of the branched portions are bent.

In the liquid crystal parallax barrier according to the present invention, the plurality of electrodes are constituted of a first electrode and a second electrode which are formed on different planes, the first electrode has a rectangular planar shape, and the second electrode is branched, and a plurality of twig portions which include distal ends of branched portions extend parallel to one side of the rectangular plane and traverse the rectangular plane.

In the liquid crystal parallax barrier according to the present invention, the plurality of electrodes are constituted of a first electrode, a second electrode and a third electrode which are formed on planes different from each other, the first electrode has a rectangular planar shape, the second electrode is branched, and a plurality of twig portions which include distal ends of branched portions extend parallel to one side of the rectangular plane and traverse the rectangular plane, and the third electrode is branched, and a plurality of twig portions which include distal ends of branched portions extend perpendicular to the plurality of twig portions of the second electrode and traverse the rectangular plane.

In the liquid crystal parallax barrier according to the present invention, the plurality of electrodes are constituted of a first electrode and a second electrode which are formed on the same plane and a third electrode and a fourth electrode which are formed on the same plane which differs from the plane on which the first electrode and the second electrode are formed, the first electrode is branched, and a plurality of twig portions which include distal ends of branched portions extend in one direction, the second electrode is branched, and a plurality of twig portions which include distal ends of branched portions extend parallel to one direction and different from one direction, out of the first electrode and the second electrode, the twig portion which includes the distal end of the branched portion of one electrode extends to enter between two twig portions which include the distal ends of the branched portions of another electrode, the third electrode is branched, and a plurality of twig portions which include distal ends of branched portions extend in a direction different from one direction, the fourth electrode is branched, and a plurality of twig portions which include distal ends of branched portions extend in a direction parallel to the direction different from one direction and in a direction different from one direction, and out of the third electrode and the fourth electrode, the twig portion which includes the distal end of the branched portion of one electrode extends to enter between two twig portions which include the distal ends of branched portions of another electrode.

According to another aspect of the present invention, there is provided a display device which includes: any one of the above-mentioned liquid crystal parallax barriers; and a display part which has a display screen thereof arranged parallel to the liquid crystal parallax barrier.

According to still another aspect of the present invention, there is provided a liquid crystal display device which includes: any one of the above-mentioned liquid crystal parallax barriers; a liquid crystal panel which is arranged parallel to the liquid crystal parallax barrier; and a backlight which radiates light to the liquid crystal panel and the liquid crystal parallax barrier.

DESCRIPTION OF THE PREFERRED EMBODIMENTS

Figure 1:
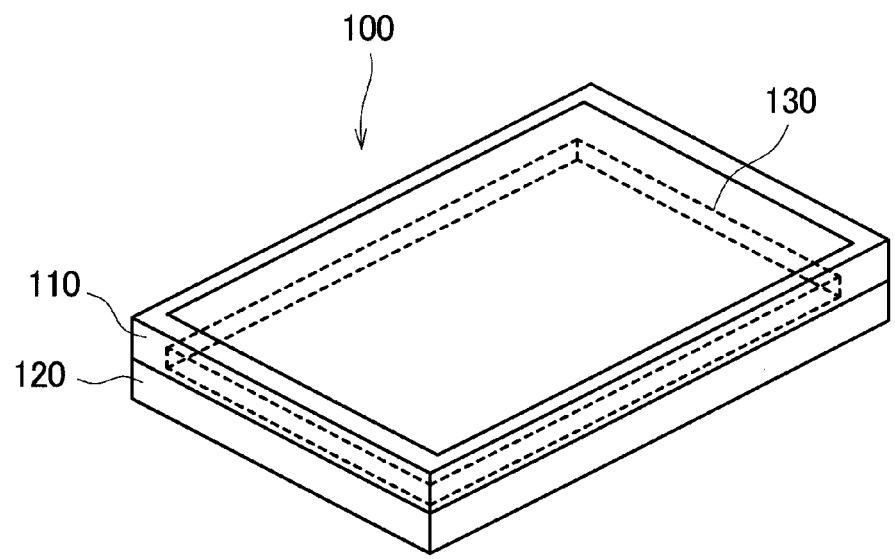
FIG. 1 is a view schematically showing a liquid crystal display device according to one embodiment of the present invention.

Hereinafter, first to sixth embodiments of the present invention are explained in conjunction with drawings. Here, in the drawings, identical or similar components are given same symbols and their repeated explanations are omitted.

[First Embodiment]

FIG. 1 schematically shows a liquid crystal display device 100 according to one embodiment of the present invention. As shown in FIG. 1, the liquid crystal display device 100 is constituted of an upper frame 110, a lower frame 120, a liquid crystal module 130 which is fixed such that the liquid crystal module 130 is sandwiched between the upper frame 110 and the lower frame 120, a power source device and the like not shown in the drawing.

Figure 2:
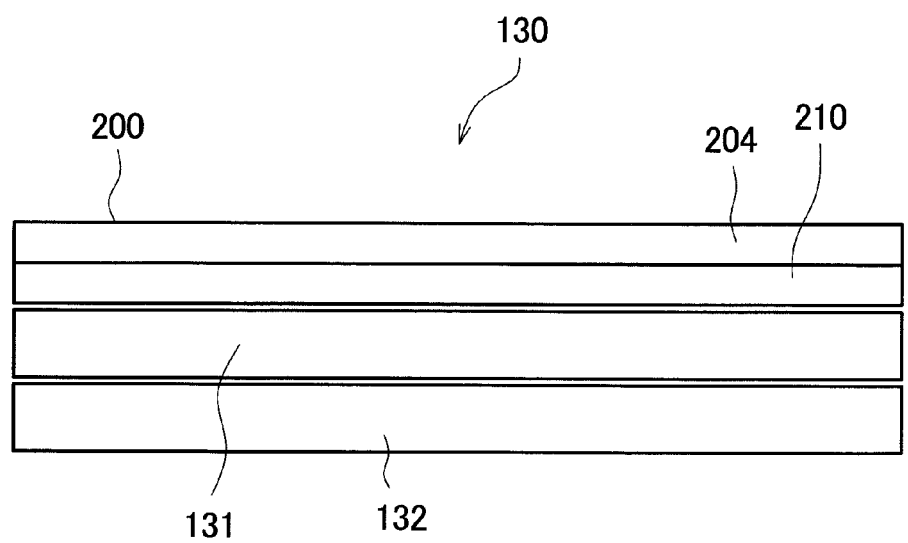
FIG. 2 is a view showing the constitution of a liquid crystal module in FIG. 1.

FIG. 2 shows the constitution of the liquid crystal module 130. The liquid crystal module 130 is constituted of: a liquid crystal parallax barrier panel 200 having slits which functions as a parallax barrier when a voltage is applied to a pixel electrode described later; a liquid crystal panel 131 which allows light corresponding to an image of a video signal to pass therethrough in response to inputting of the video signal; and a backlight 132 which radiates light to the liquid crystal panel 131 and the liquid crystal parallax barrier panel 200 thus allowing liquid crystal display screens to display images thereon. The backlight 132 is constituted of a light source which is formed of a cold cathode tube (CFL) or a light emitting diode (LED), an optical sheet which is constituted of a reflection sheet, a diffusion sheet and the like, alight guide plate and the like. Here, the liquid crystal parallax barrier panel 200 includes an electrode substrate 210 on which electrodes are formed, a liquid crystal composition not shown in the drawing, and a sealing substrate 204 which seals the liquid crystal composition between the sealing substrate 204 and the electrode substrate 210. Although the whole liquid crystal display device may be referred to as "liquid crystal module", in this specification, the above-mentioned constitution shown in FIG. 2 is referred to as "liquid crystal module".

Figure 3:
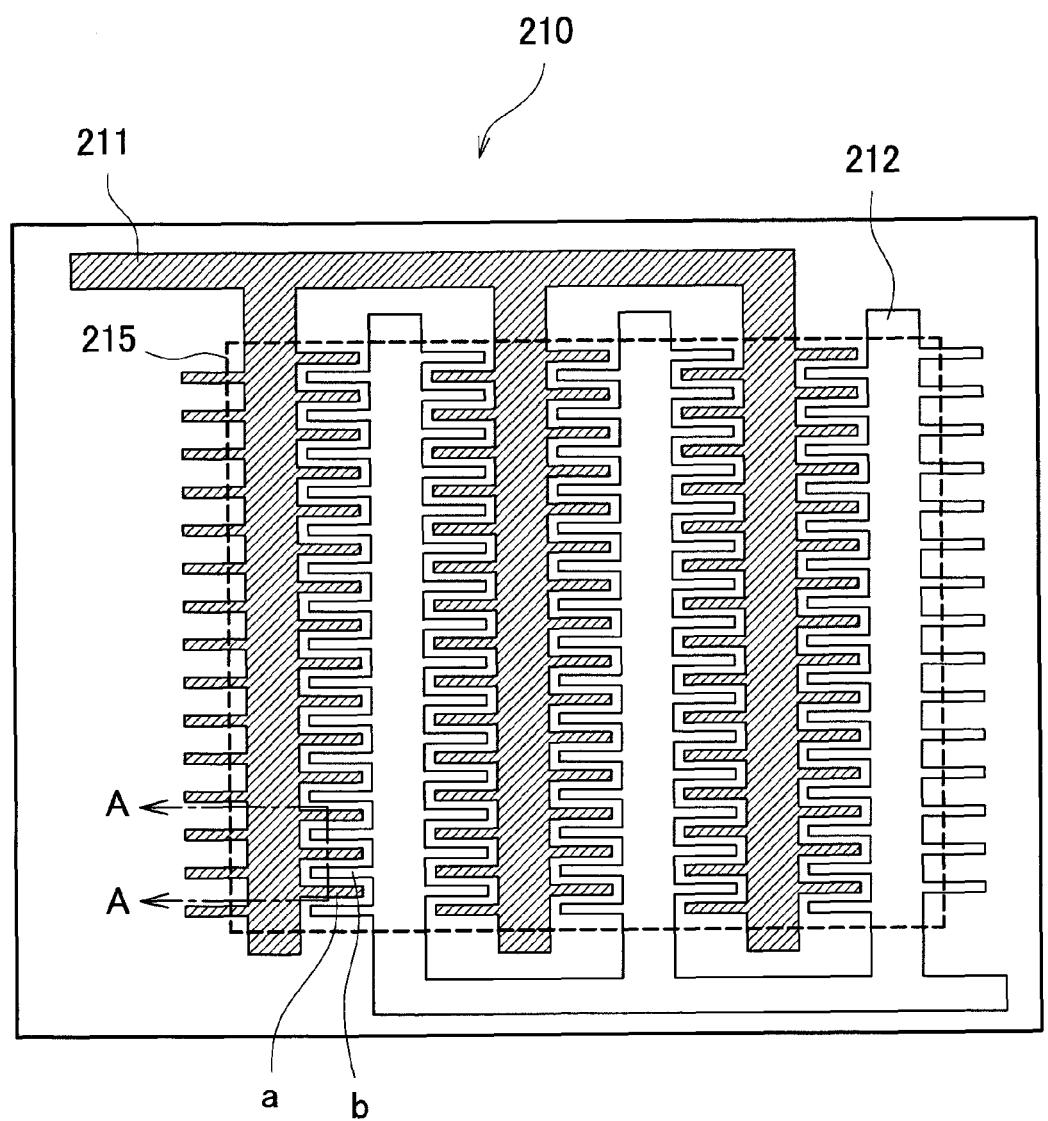
FIG. 3 is a view schematically showing the arrangement of electrodes on an electrode substrate in FIG. 2.

FIG. 3 schematically shows the arrangement of electrodes on the electrode substrate 210. As shown in FIG. 3, the electrode substrate 210 includes a first electrode 211 and a second electrode 212 which are branched in plural stages respectively. With respect to these electrodes, in a display region 215, twig portions which include distal ends of branched portions of one electrode and twig portions which include distal ends of branched portions of another electrode are alternately arranged such that one twig portion of one electrode is arranged between two twig portions of another electrode. In a state where the first electrode 211 and the second electrode 212 have the same potential, the slits are not formed in the parallax barrier, while when a predetermined voltage having a potential which differs from the above-mentioned same potential is applied to the first electrode 211, the slits are formed in the parallax barrier. Here, in FIG. 3, to prevent the drawing from becoming cumbersome, the electrodes are shown in a simplified manner by decreasing the number of slits.

Figure 4:
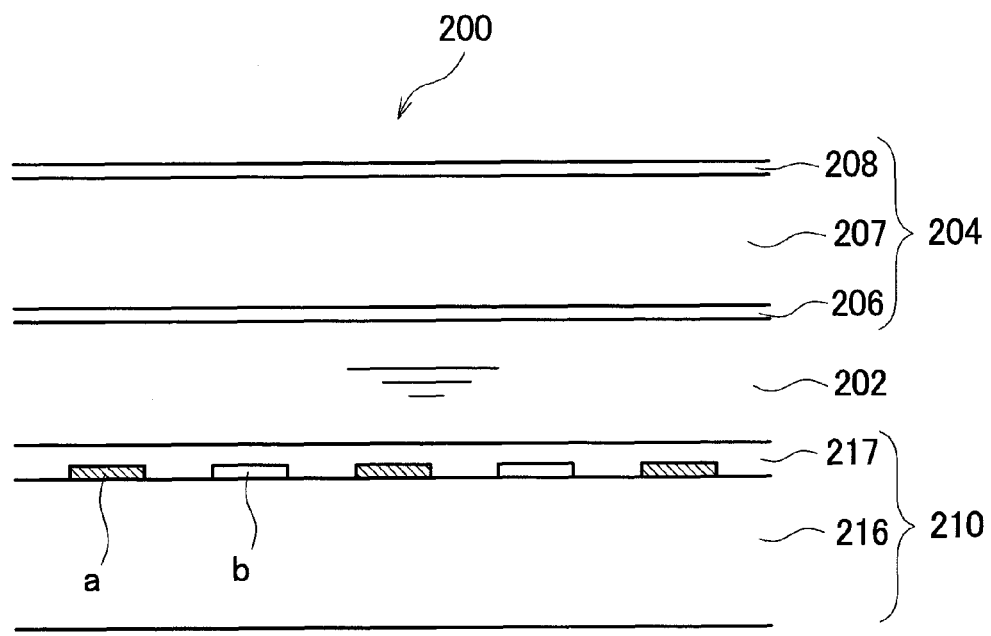
FIG. 4 is a cross-sectional view of a liquid crystal parallax barrier panel taken along a line A-A on the electrode substrate in FIG. 3.

FIG. 4 shows a cross section of the liquid crystal parallax barrier panel 200 taken along a line A-A in FIG. 3 showing the electrode substrate 210. As shown in FIG. 4, the liquid crystal parallax barrier panel 200 has the structure where the electrode substrate 210, a liquid crystal layer 202, and a sealing substrate 204 are stacked in order. The electrode substrate 210 includes a glass substrate 216, the first electrode 211 (twig portions a), the second electrode 212 (twig portions b) which is arranged on the same layer as the first electrode 211, and an alignment film 217 which aligns molecules of the liquid crystal composition in the predetermined direction when a voltage is not applied to the first electrode 211. On the other hand, the sealing substrate 204 includes an alignment film 206, a glass substrate 207 and a polarizer 208. However, electrodes are not arranged on the sealing substrate 204.

Figure 5:
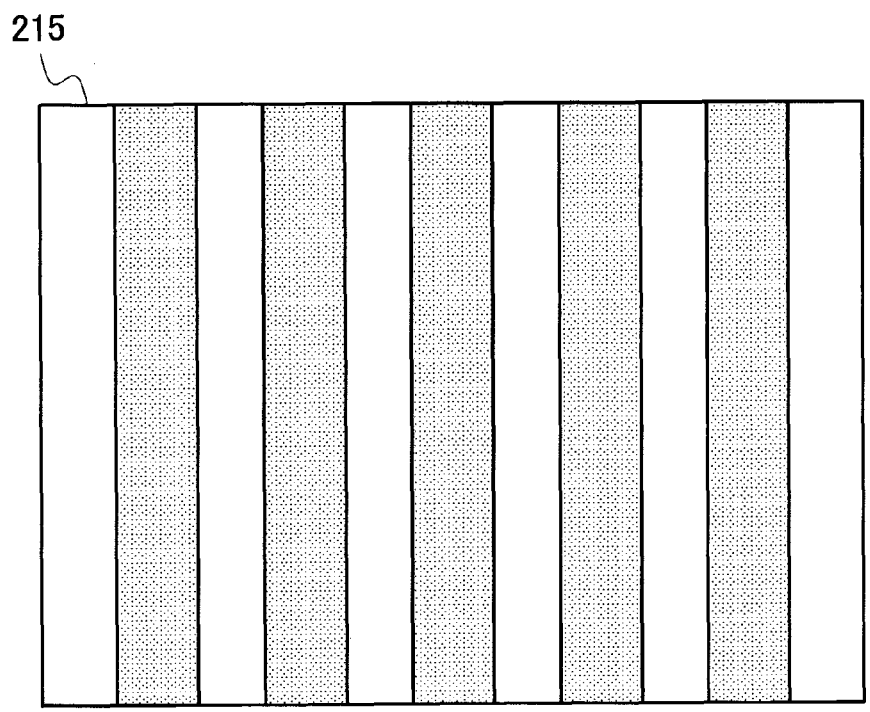
FIG. 5 is a view showing a state of a display region when a predetermined voltage is applied to a first electrode.

In the liquid crystal parallax barrier panel 200, when a predetermined voltage is applied to the first electrode 211, an electric field is generated between the twig portion "a" which includes the distal end of the first electrode 211 and the twig portion "b" which includes the distal end of the second electrode 212. This electric field changes the alignment of the molecules of the liquid crystal composition arranged above the twig portions "a", "b" and hence, light radiated from the backlight 132 is blocked thus forming the slits in the liquid crystal parallax barrier panel 200 whereby the liquid crystal parallax barrier panel 200 functions as the parallax barrier. That is, the liquid crystal parallax barrier panel 200 is driven by a normally white method. FIG. 5 shows a state of the display region 215 when the predetermined voltage is applied to the first electrode 211. In FIG. 5, black portions indicate portions where light radiated from the backlight 132 is blocked.

In this manner, in the liquid crystal parallax barrier panel 200 of the first embodiment, the electrodes are formed on only one substrate and hence, the liquid crystal parallax barrier panel and a liquid crystal display device which uses the liquid crystal parallax barrier panel can be manufactured at a lower cost.

Figure 6:
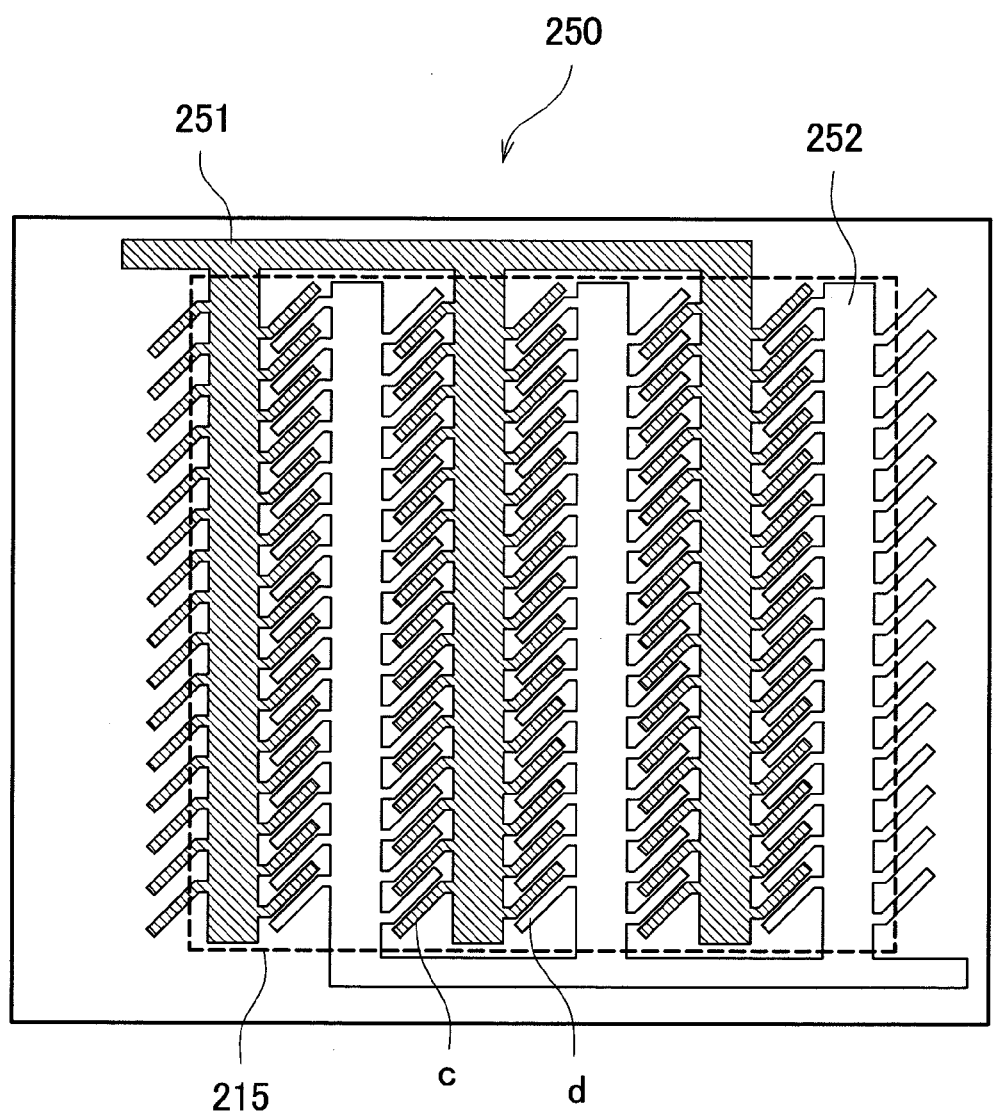
FIG. 6 is a view schematically showing the arrangement of electrodes on the electrode substrate which is a modification of the first embodiment.

FIG. 6 schematically shows the arrangement of electrodes on an electrode substrate 250 according to a modification of the first embodiment. In the same manner as the above-mentioned first embodiment, the electrode substrate 250 includes a first electrode 251 and a second electrode 252 which are branched in plural stages respectively. With respect to these electrodes, in a display region 215, twig portions which include distal ends of a branched portion of one electrode and twig portions which include distal ends of branched portions of another electrode are alternately arranged such that one twig portion of one electrode is arranged between two twig portions of another electrode. In this modification, the twig portions "c" which include distal ends of the branched portions of the first electrode 251 and the twig portions "d" which include the distal ends of the branched portions of the second electrode 252 are formed such that these twig portions are bent at intermediate portions thereof respectively and extend obliquely. The electrodes are formed into such a shape to enhance the light blocking property when the slits are formed. The electrodes can be formed into an appropriate shape by taking the polarization direction of a polarizer, the rubbing direction of the alignment film or the like into consideration.

In this manner, also in the liquid crystal parallax barrier which uses the electrode substrate 250 according to the modification of the first embodiment, the electrodes are formed only on one substrate and hence, the liquid crystal parallax barrier panel and a liquid crystal display device which uses the liquid crystal parallax barrier panel can be manufactured at a lower cost.

[Second Embodiment]

Figure 7:
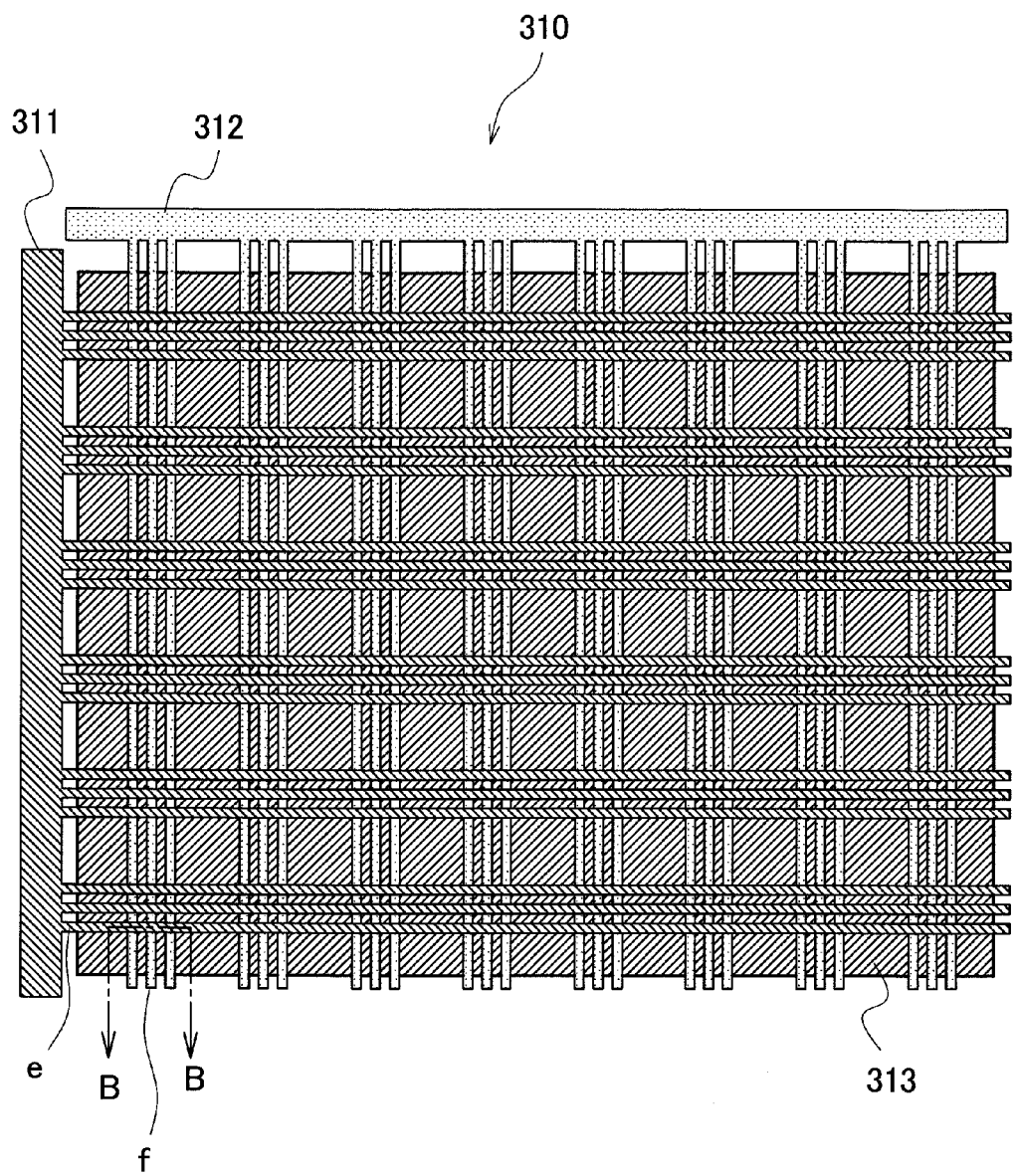
FIG. 7 is a view schematically showing the arrangement of electrodes on the electrode substrate of the liquid crystal parallax barrier in the liquid crystal display device according to one embodiment of the present invention.

FIG. 7 schematically shows the arrangement of the electrodes on an electrode substrate 310 of a liquid crystal parallax barrier in a liquid crystal display device according to the second embodiment of the present invention. Here, the constitution of the liquid crystal display device in which the electrode substrate 310 is used is substantially equal to the constitution of the liquid crystal display device 100 of the first embodiment shown in FIG. 1 and the liquid crystal module 130 of the first embodiment shown in FIG. 2 and hence, the explanation of the constitution of the liquid crystal display device of this embodiment is omitted here.

As shown in FIG. 7, the electrode substrate 310 includes a first electrode 311 in which twig portions "e" which include distal ends of branched portions of the first electrode 311 extend in the lateral direction in the drawing and a second electrode 312 in which twig portions "f" which include distal ends of branched portions of the second electrode 312 extend in the longitudinal direction in the drawing, and a third electrode 313 which extend over the whole display region. These electrodes are arranged on different layers. In a state where the first electrode 311, the second electrode 312 and the third electrode 313 have the same potential, slits are not formed in the parallax barrier. In forming the slits extending in the lateral direction, a predetermined voltage is applied only to the first electrode 311 so as to generate an electric field between the first electrode 311 and the third electrode 313. Further, in forming the slits extending in the longitudinal direction, a predetermined voltage is applied only to the second electrode 312 so as to generate an electric field between the second electrode 312 and the third electrode 313. Here, in FIG. 7, to prevent the drawing from becoming cumbersome, the electrodes are shown in a simplified manner by decreasing the number of slits.

Figure 8:
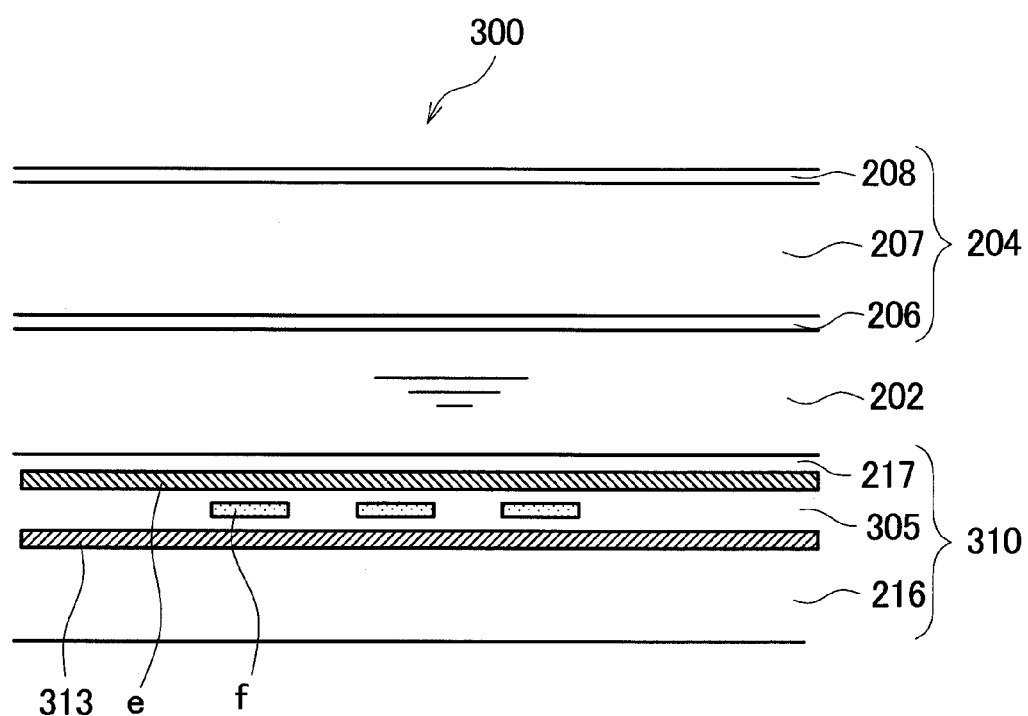
FIG. 8 is a cross-sectional view of the liquid crystal parallax barrier panel taken along a line B-B on the electrode substrate in FIG. 7.

FIG. 8 shows a cross section of the liquid crystal parallax barrier panel 300 taken along a line B-B in FIG. 7 showing the electrode plate 310. As shown in FIG. 8, the liquid crystal parallax barrier panel 300 has the substantially same constitution as the first embodiment except for the electrode substrate 310. The electrode substrate 310 includes a glass substrate 216, the first electrode 311 (twig portions "e"), the second electrode 312 (twig portions "f") which is arranged on a layer different from a layer on which the first electrode 311 is arranged, the third electrode 313 which is arranged on the layer which differs from both layers on which the first electrode 311 and the second electrode 312 are arranged respectively, an insulation layer 305 which insulates the first electrode 311, the second electrode 312 and the third electrode 313 from each other, and an alignment film 217 which aligns molecules of liquid crystal composition when a voltage is not applied to the first electrode 311 or the second electrode 312.

In the liquid crystal parallax barrier panel 300, when a predetermined voltage is applied to the first electrode 311, an electric field is generated between the twig portion "e" of the first electrode 311 which extends in the lateral direction and the third electrode 313. This electric field changes the alignment of the molecules of the liquid crystal composition arranged above the twig portions "e", "f" and hence, light radiated from the backlight 132 is blocked thus forming lateral slits in the liquid crystal parallax barrier panel 300 whereby the liquid crystal parallax barrier panel 300 functions as the parallax barrier. On the other hand, when a predetermined voltage is applied to the second electrode 312, an electric field is generated between the twig portion "f" of the second electrode 312 which extends in the longitudinal direction and the third electrode 313. This electric field changes the alignment of the molecules of the liquid crystal composition arranged above the twig portions "e", "f" and hence, light radiated from the backlight 132 is blocked thus forming longitudinal slits in the liquid crystal parallax barrier panel 300 whereby the liquid crystal parallax barrier panel 300 functions as the parallax barrier.

In the above-mentioned embodiment, three electrodes consisting of the first electrode 311, the second electrode 312 and the third electrode 313 are used. However, even when the constitution lacks either one of the first electrode 311 and the second electrode 312, the liquid crystal parallax barrier can be used as a liquid crystal parallax barrier which forms the slits therein only in one direction and hence, the liquid crystal parallax barrier panel 300 may adopt such a constitution.

In this manner, in the liquid crystal parallax barrier panel 300 of this embodiment, the electrodes are formed on only one substrate and hence, the liquid crystal parallax barrier panel and a liquid crystal display device which uses the liquid crystal parallax barrier panel can be manufactured at a lower cost.

[Third Embodiment]

Figure 9:
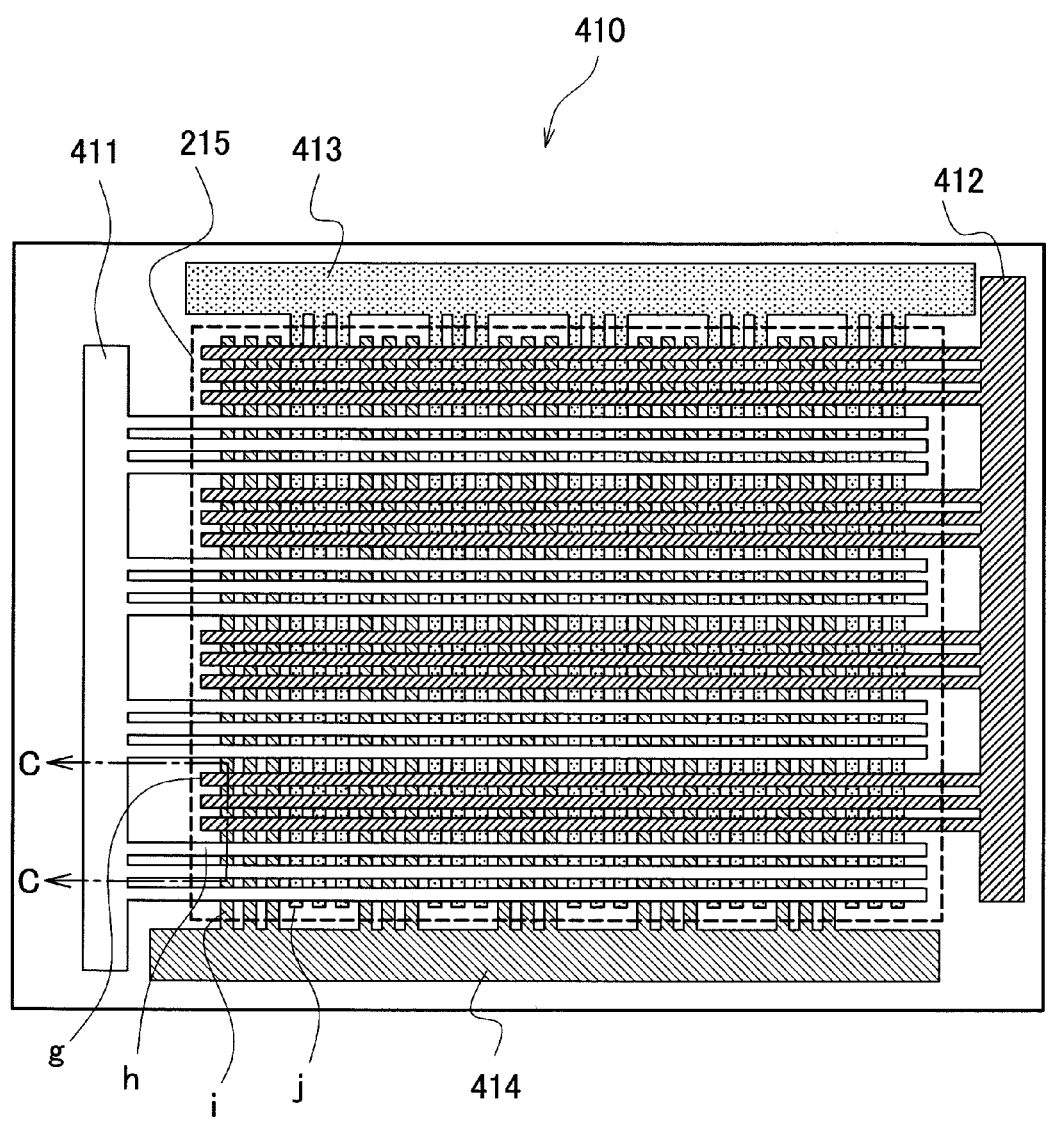
FIG. 9 is a view schematically showing the arrangement of electrodes on the electrode substrate of the liquid crystal parallax barrier in the liquid crystal display device according to one embodiment of the present invention.

FIG. 9 schematically shows the arrangement of the electrodes on an electrode substrate 410 of a liquid crystal parallax barrier in a liquid crystal display device according to the third embodiment of the present invention. Here, the constitution of the liquid crystal display device in which the electrode substrate 410 is used is substantially equal to the constitution of the liquid crystal display device 100 of the first embodiment shown in FIG. 1 and the liquid crystal module 130 of the first embodiment shown in FIG. 2 and hence, the explanation of the constitution of the liquid crystal display device of this embodiment is omitted here.

As shown in FIG. 9, the electrode substrate 410 includes: a first electrode 411 and a second electrode 412 where twig portions "g", "h" which include distal ends of branched portions of these electrodes 411, 412 laterally extend in the directions opposite to each other in the drawing; and a third electrode 413 and a fourth electrode 414 where twig portions "i", "j" which include distal ends of branched portions of these electrodes 413, 414 longitudinally extend in the directions opposite to each other in the drawing. The first electrode 411 and the second electrode 412 are arranged on the same layer, while the third electrode 413 and the fourth electrode 414 are arranged on the same layer which differs from the layer on which the first electrode 411 and the second electrode 412 are arranged.

In a state where slits are not formed in the parallax barrier, the first electrode 411, the second electrode 412, the third electrode 413 and the fourth electrode 414 have the same potential. In forming the slits extending in the lateral direction, a predetermined voltage is applied only to the first electrode 411 so as to generate an electric field between the first electrode 411 and the third electrode 413 and between the first electrode 411 and the fourth electrode 414. Further, in forming the slits extending in the longitudinal direction, a predetermined voltage is applied only to the third electrode 413 so as to generate an electric field between the third electrode 413 and the first electrode 411 and between the third electrode 413 and the second electrode 412. Here, in FIG. 9, to prevent the drawing from becoming cumbersome, the electrodes are shown in a simplified manner by decreasing the number of slits.

Figure 10:
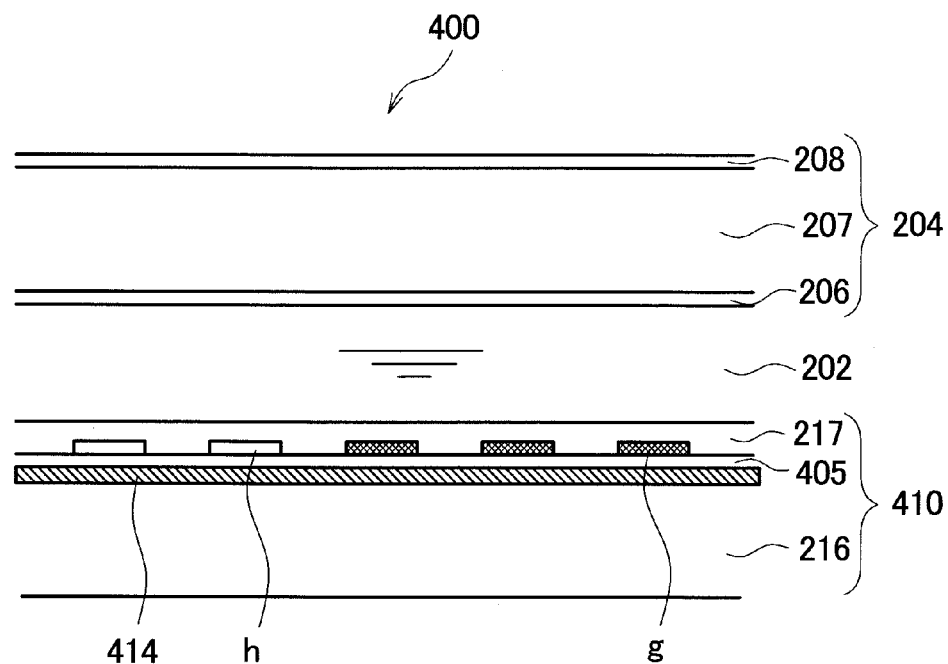
FIG. 10 is a cross-sectional view of the liquid crystal parallax barrier panel taken along a line C-C on the electrode substrate in FIG. 9.

FIG. 10 shows a cross section of a liquid crystal parallax barrier panel 400 taken along a line C-C in FIG. 9 showing the electrode plate 410. As shown in FIG. 9, the liquid crystal parallax barrier panel 400 has the substantially same constitution as the first embodiment except for the electrode substrate 410. The electrode substrate 410 includes a glass substrate 216, the first electrode 411 (twig portions "g") and the second electrode 412 (twig portions "h") which are formed on the same layer as described above, the third electrode 413 (not shown in the drawing) and the fourth electrode 414 which are formed on the same layer which differs from the layer on which the first electrode 411 and the second electrode 412 are formed, an insulation layer 405 which insulates the layer on which the first electrode 411 and the second electrode 412 are formed and the layer on which the third electrode 413 and the fourth electrode 414 are formed from each other, and an alignment film 217 which aligns molecules of liquid crystal composition when a voltage is not applied to the first electrode 411 or the third electrode 413.

In the liquid crystal parallax barrier panel 400, when a predetermined voltage is applied to the first electrode 411, an electric field is generated between the twig portion "h" of the first electrode 411 which extends in the lateral direction and the third electrode 413 and between the twig portion "h" and the fourth electrode 414. This electric field changes the alignment of the molecules of the liquid crystal composition arranged above the twig portions "h" and hence, light radiated from the backlight 132 is blocked thus forming slits in the liquid crystal parallax barrier panel 400 whereby the liquid crystal parallax barrier panel 400 functions as the parallax barrier. On the other hand, when a predetermined voltage is applied to the third electrode 413, an electric field is generated between the twig portion "j" of the third electrode 413 which extends in the longitudinal direction and the first electrode 411 and between the twig portion "j" and the second electrode 412. This electric field changes the alignment of the molecules of the liquid crystal composition arranged above the twig portions "j" and hence, light radiated from the backlight 132 is blocked thus forming slits in the liquid crystal parallax barrier panel 400 whereby the liquid crystal parallax barrier panel 400 functions as the parallax barrier.

In this manner, in the liquid crystal parallax barrier panel 400 and the liquid crystal display device which uses the liquid crystal parallax barrier panel 400 according to this embodiment, the electrodes are formed on only one substrate and hence, the liquid crystal parallax barrier panel and the liquid crystal display device which uses the liquid crystal parallax barrier panel can be manufactured at a lower cost.

[Fourth Embodiment]

Figure 11:
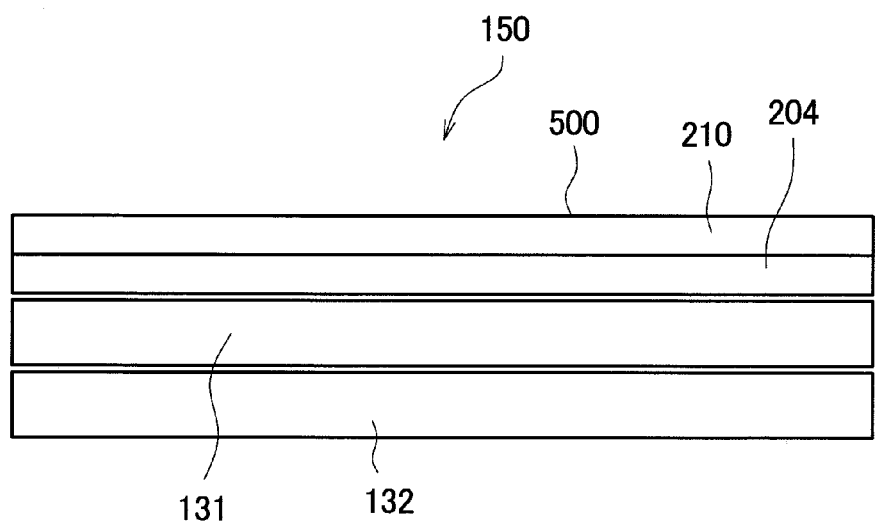
FIG. 11 is a view showing the constitution of a liquid crystal module in the liquid crystal display device according to one embodiment of the present invention.

FIG. 11 shows the constitution of a liquid crystal module 150 in a liquid crystal display device according to the fourth embodiment of the present invention. Here, the constitution of the liquid crystal display device in which the liquid crystal module 150 is used is substantially equal to the constitution of the liquid crystal display device 100 of the first embodiment shown in FIG. 1 and hence, the explanation of the constitution of the liquid crystal display device of this embodiment is omitted here. The liquid crystal module 150 includes a liquid crystal parallax barrier panel 500. The liquid crystal parallax barrier panel 500 is configured such that the electrode substrate 210 and the sealing substrate 204 shown in FIG. 2 are exchanged.

Such a constitution can also form slits in the liquid crystal parallax barrier panel 500. Further, also in the liquid crystal parallax barrier panel 500 of the fourth embodiment, in the same manner as the first embodiment, electrodes are formed on only one substrate and hence, the liquid crystal parallax barrier panel and a liquid crystal display device which uses the liquid crystal parallax barrier panel can be manufactured at a lower cost.

[Fifth Embodiment]

Figure 12:
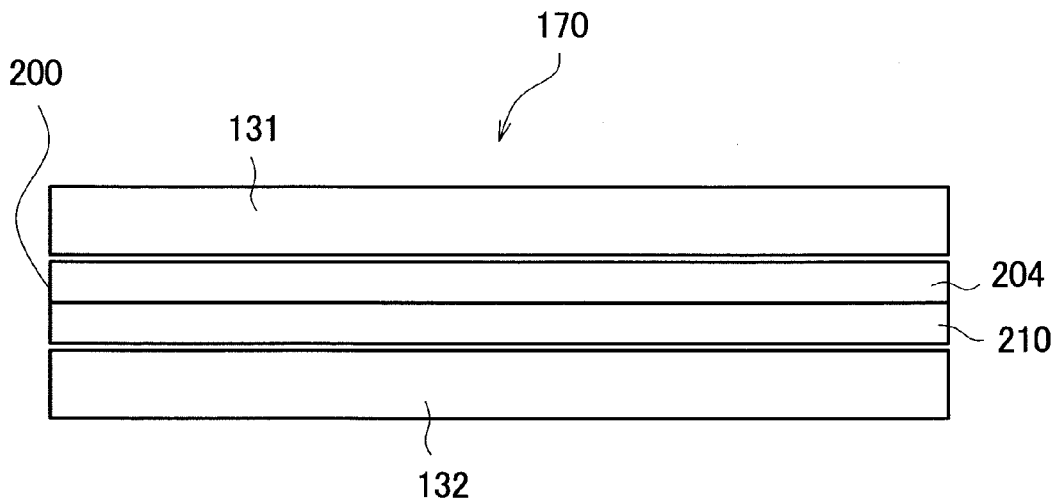
FIG. 12 is a view showing the constitution of the liquid crystal module in the liquid crystal display device according to one embodiment of the present invention.

FIG. 12 shows the constitution of a liquid crystal module 170 in a liquid crystal display device according to the fifth embodiment of the present invention. Here, the constitution of the liquid crystal display device in which the liquid crystal module 170 is used is substantially equal to the constitution of the liquid crystal display device 100 of the first embodiment shown in FIG. 1 and hence, the explanation of the constitution of the liquid crystal display device of this embodiment is omitted here. The liquid crystal module 170 is configured such that the liquid crystal parallax barrier panel 200 and the liquid crystal panel 131 of the first embodiment are exchanged. Such a constitution also allows a viewer to observe a three-dimensional image formed by light passing through the slits. Further, in the same manner as the first embodiment, electrodes are formed on only one substrate in this embodiment and hence, the liquid crystal parallax barrier panel and a liquid crystal display device which uses the liquid crystal parallax barrier panel can be manufactured at a lower cost.

[Sixth Embodiment]

Figure 13:
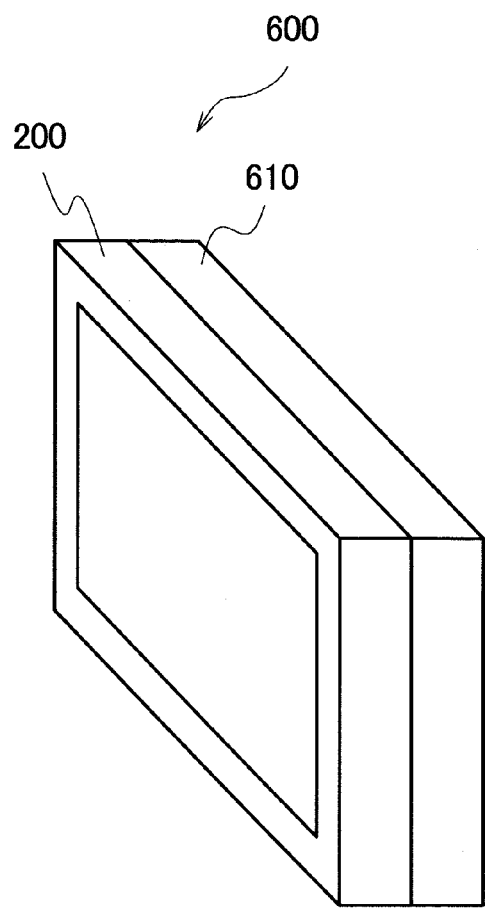
FIG. 13 is a view showing a plasma display device according to one embodiment of the present invention.

FIG. 13 shows a plasma display device 600 according to the sixth embodiment of the present invention. The plasma display device 600 is constituted of the above-mentioned liquid crystal parallax barrier panel 200 of the first embodiment and a known plasma panel 610 which performs a display by emission of light caused by discharge. Such a constitution also allows a viewer to observe a three-dimensional image. Further, in the same manner as the first embodiment, electrodes are formed on only one substrate in this embodiment and hence, the liquid crystal parallax barrier panel and a plasma display device which uses the liquid crystal parallax barrier panel can be manufactured at a lower cost.

In the above-mentioned embodiments, the liquid crystal panel or the plasma panel is used. However, the present invention is applicable to a display device which uses a display part constituted of an organic EL (Electro-luminescent) panel, a CRT (Cathode Ray Tube) or the like.

Further, the above-mentioned shapes and arrangements of electrodes described in the respective embodiments are provided merely as examples, and the present invention is applicable to a liquid crystal parallax barrier which arranges electrodes only on one substrate.

What is claimed is:

1. A liquid crystal parallax barrier which forms a parallax barrier for performing a three-dimensional display by controlling alignment of liquid crystal molecules, the liquid crystal parallax barrier comprising:
    two glass substrates which are arranged parallel to each other;
    liquid crystal which is sealed between two glass substrates; and
    a plurality of electrodes;
    wherein the plurality of electrodes are arranged on only one glass substrate out of the two glass substrates,
    wherein the parallax barrier is formed by making a voltage applied to one electrode different from a voltage applied to another electrode out of the plurality of electrodes,
    wherein the plurality of electrodes are constituted of a first electrode and a second electrode which are formed on the same plane,
    wherein the first electrode and the second electrode are branched respectively, and
    wherein out of the first electrode and the second electrode, twig portions which include distal ends of branched portions of one electrode and twig portions which include distal ends of branched portions of another electrode are alternately arranged such that the twig portion of one electrode is arranged between two twig portions of another electrode.

2. The liquid crystal parallax barrier according to claim 1, wherein the twig portions which include the distal ends of the branched portions are bent.

3. A liquid crystal parallax barrier which forms a parallax barrier for performing a three-dimensional display by controlling alignment of liquid crystal molecules, the liquid crystal parallax barrier comprising:
    two glass substrates which are arranged parallel to each other;
    liquid crystal which is sealed between two glass substrates; and
    a plurality of electrodes;
    wherein the plurality of electrodes are arranged on only one glass substrate out of the two glass substrates,
    wherein the parallax barrier is formed by making a voltage applied to one electrode different from a voltage applied to another electrode out of the plurality of electrodes;
    wherein the plurality of electrodes are constituted of a first electrode and a second electrode which are formed on different planes,
    wherein the first electrode has a rectangular planar shape, and
    wherein the second electrode is branched, and a plurality of twig portions which include distal ends of branched portions extend parallel to one side of the rectangular plane and traverse the rectangular plane.

4. A liquid crystal parallax barrier which forms a parallax barrier for performing a three-dimensional display by controlling alignment of liquid crystal molecules, the liquid crystal parallax barrier comprising:
    two glass substrates which are arranged parallel to each other;
    liquid crystal which is sealed between two glass substrates; and
    a plurality of electrodes;
    wherein the plurality of electrodes are arranged on only one glass substrate out of the two glass substrates;
    wherein the parallax barrier is formed by making a voltage applied to one electrode different from a voltage applied to another electrode out of the plurality of electrodes;
    wherein the plurality of electrodes are constituted of a first electrode, a second electrode and a third electrode which are formed on planes different from each other;
    wherein the first electrode has a rectangular planar shape;
    wherein the second electrode is branched, and a plurality of twig portions which include distal ends of branched portions extend parallel to one side of the rectangular plane and traverse the rectangular plane; and
    wherein the third electrode is branched, and a plurality of twig portions which include distal ends of branched portions extend perpendicular to the plurality of twig portions of the second electrode and traverse the rectangular plane.

5. A liquid crystal parallax barrier which forms a parallax barrier for performing a three-dimensional display by controlling alignment of liquid crystal molecules, the liquid crystal parallax barrier comprising:
    two glass substrates which are arranged parallel to each other;
    liquid crystal which is sealed between two glass substrates; and
    a plurality of electrodes;
    wherein the plurality of electrodes are arranged on only one glass substrate out of the two glass substrates;
    wherein the parallax barrier is formed by making a voltage applied to one electrode different from a voltage applied to another electrode out of the plurality of electrodes;
    wherein the plurality of electrodes are constituted of a first electrode and a second electrode which are formed on the same plane and a third electrode and a fourth electrode which are formed on the same plane which differs from the plane on which the first electrode and the second electrode are formed;
    wherein the first electrode is branched, and a plurality of twig portions which include distal ends of branched portions extend in one direction;
    wherein the second electrode is branched, and a plurality of twig portions which include distal ends of branched portions extend parallel to said one direction and different from said one direction;
    wherein out of the first electrode and the second electrode, the twig portion which includes the distal end of the branched portion of said one electrode extends to enter between two twig portions which include the distal ends of the branched portions of said another electrode;
    wherein the third electrode is branched, and a plurality of twig portions which include distal ends of branched portions extend in a direction different from said one direction;

wherein the fourth electrode is branched, and a plurality of twig portions which include distal ends of branched portions extend in parallel to the direction different from said one direction and in a direction different from said one direction; and wherein out of the third electrode and the fourth electrode, the twig portion which includes the distal end of the branched portion of one electrode extends to enter between two twig portions which include the distal ends of branched portions of another electrode.

6. The liquid crystal parallax barrier according to claim 1, wherein the liquid crystal parallax barrier is driven by a normally white method.

7. A display device comprising:
the liquid crystal parallax barrier described in claim 1; and
a display part which has a display screen thereof arranged parallel to the liquid crystal parallax barrier.

8. A liquid crystal display device comprising:
the liquid crystal parallax barrier described in claim 1;
a liquid crystal panel which is arranged parallel to the liquid crystal parallax barrier; and
a backlight which radiates light to the liquid crystal panel and the liquid crystal parallax barrier.

9. The liquid crystal parallax barrier according to claim 1, wherein the plurality of electrodes are constituted of the first electrode and the second electrode which are formed on the same plane and a third electrode and a fourth electrode which are formed on a same plane which differs from the plane on which the first electrode and the second electrode are formed,
wherein the first electrode is branched, and the plurality of twig portions which include distal ends of the branched portions extend in one direction,
wherein the second electrode is branched, and the plurality of twig portions which include distal ends of the branched portions extend parallel to the one direction and different from the one direction,
wherein out of the first electrode and the second electrode, the twig portion which includes the distal end of the branched portion of the one electrode extends to enter between two twig portions which include the distal ends of the branched portions of the another electrode,
wherein the third electrode is branched, and a plurality of twig portions which include distal ends of branched portions extend in a direction different from the one direction,
wherein the fourth electrode is branched, and a plurality of twig portions which include distal ends of branched portions extend in parallel to the direction different from the one direction and in a direction different from the one direction, and
wherein out of the third electrode and the fourth electrode, the twig portion which includes the distal end of the branched portion of one electrode extends to enter between two twig portions which include the distal ends of branched portions of another electrode.

10. The liquid crystal parallax barrier according to claim 3, wherein the plurality of electrodes are constituted of the first electrode, the second electrode and a third electrode which are formed on planes different from each other, and
wherein the third electrode is branched, and a plurality of twig portions which include distal ends of branched portions extend perpendicular to the plurality of twig portions of the second electrode and traverse the rectangular plane.

* * * * *